US010660035B2

(12) United States Patent
Neamatollahi et al.

(10) Patent No.: US 10,660,035 B2
(45) Date of Patent: May 19, 2020

(54) METHOD FOR DYNAMICALLY SCHEDULING CLUSTERING OPERATION

(71) Applicants: Peyman Neamatollahi, Mashhad (IR); Mahmoud Naghibzadeh, Mashhad (IR); Saeid Abrishami, Mashhad (IR)

(72) Inventors: Peyman Neamatollahi, Mashhad (IR); Mahmoud Naghibzadeh, Mashhad (IR); Saeid Abrishami, Mashhad (IR)

(*) Notice: Subject to any disclaimer, the term of this patent is extended or adjusted under 35 U.S.C. 154(b) by 0 days.

(21) Appl. No.: 15/994,643

(22) Filed: May 31, 2018

(65) Prior Publication Data

US 2019/0098573 A1  Mar. 28, 2019

(51) Int. Cl.
*H04W 52/02* (2009.01)
*H04W 72/12* (2009.01)
*H04W 28/02* (2009.01)
*H04W 84/20* (2009.01)
*H04W 84/00* (2009.01)

(52) U.S. Cl.
CPC ..... *H04W 52/0219* (2013.01); *H04W 28/021* (2013.01); *H04W 52/0216* (2013.01); *H04W 52/0229* (2013.01); *H04W 52/0261* (2013.01); *H04W 72/121* (2013.01); *H04W 72/1252* (2013.01); *H04W 72/1257* (2013.01); *H04W 84/005* (2013.01); *H04W 84/20* (2013.01)

(58) Field of Classification Search
CPC ......... H04W 52/0216; H04W 52/0219; H04W 52/0229; H04W 52/0261; H04W 72/121; H04W 72/1252; H04W 72/1257; H04W 28/021; H04W 84/005; H04W 84/20
See application file for complete search history.

(56) References Cited

U.S. PATENT DOCUMENTS 7,035,240 B1  4/2006  Balakrishnan et al.
7,830,838 B2  11/2010  Kohvakka et al.
(Continued)

FOREIGN PATENT DOCUMENTS

CN  101610567 A  7/2009
KR  20060055635 A  11/2004

OTHER PUBLICATIONS

Peyman Neamatollahi et al., "Distributed Clustering-Task Scheduling for Wireless Sensor Networks Using Dynamic Hyper Round Policy," IEEE Transactions on Mobile Computing, vol. 17, No. 2, Feb. 2018 (pp. 334-347).
(Continued)

*Primary Examiner* — Joshua Kading
(74) *Attorney, Agent, or Firm* — NovoTechIP International PLLC (57) ABSTRACT

An improved method of dynamically scheduling clustering operations in a network includes determining if one or more conditions for reclustering are met before deciding to perform the next reclustering operation. Therefore, to achieve load balancing for a network, the method of dynamically scheduling clustering operations schedules reclustering operations only at required times. This may be based on various factors such as remaining node energy, node movements, the number of nodes in the clusters, and/or other conditions of the nodes in the network. Therefore, by tuning the reclustering time dynamically, the method effectively controls the clustering overhead throughout the network lifetime and handles the mobility of nodes.

18 Claims, 10 Drawing Sheets

(56) References Cited

U.S. PATENT DOCUMENTS

| | | |
|---|---|---|
| 8,055,740 B2 | 11/2011 | Kim et al. |
| 8,134,950 B2 | 3/2012 | Pun |
| 8,547,982 B2 | 10/2013 | Sultan et al. |
| 8,605,694 B2 | 12/2013 | Park et al. |
| 2008/0109536 A1 | 5/2008 | Hong et al. |
| 2011/0128131 A1 | 6/2011 | Kim et al. |
| 2013/0128786 A1* | 5/2013 | Sultan ............... H04W 52/0238 370/311 |
| 2016/0277488 A1* | 9/2016 | Fallon ................... H04L 41/042 |

OTHER PUBLICATIONS

Neamatollahi et al., "Fuzzy-based Clustering-task Scheduling for Lifetime Enhancement in Wireless Sensor Networks," IEEE Sensors Journal, vol. 17, No. 20, 6837-6844, Oct. 15, 2017.

* cited by examiner

METHOD FOR DYNAMICALLY SCHEDULING CLUSTERING OPERATION

TECHNICAL FIELD

The present application relates generally to dynamic scheduling of clustering operations in clustered networks which need periodic reclustering, and more particularly to an improved method of dynamic clustering-task scheduling for these networks.

BACKGROUND

In many energy constrained networks, by making optimum use of the limited energy of nodes, early energy depletion may be avoided. One way in which this can be achieved is through clustering the nodes.

Generally, in a cluster, there is a significant difference in the amount of energy consumed by cluster heads and that consumed by other nodes. Because of this difference, most clustering approaches include mechanisms for balancing the nodes' workload to avoid premature death of certain nodes. To attain load balancing, most clustering approaches use the Round-Based Policy (RBP) approach which schedules the clustering-task statically by splitting the time into fixed length rounds, at the beginning of which clustering is performed. By rotating the cluster head responsibility among the nodes and reconstructing the cluster formation, periodic reclustering used by RBP balances the load of the network nodes. However, the load balancing function uses a significant amount of energy. When done repeatedly in each round, the reclustering operation can waste a lot of energy.

Additionally, clustering in fixed length rounds can only be used for networks with non-mobile nodes. For networks having mobile nodes (for example, in IoT applications), RBP-based clustering may not be effective, since the reclustering time is fixed/predetermined, while the need for reclustering depends on the mobility of the nodes and network topology changes. For example, if a node is removed from its cluster due to mobility, the network may need to recluster to place all the nodes in network clusters. However, according to the RBP, the node would need to continue its operation until the next round for reclustering.

Therefore, a need exists for providing an improved method of scheduling the clustering-tasks in networks that need consecutive reclustering.

SUMMARY

A method for scheduling a reclustering operation in a network including a plurality of nodes is disclosed. In one implementation, the method includes determining if a first one of the plurality of nodes is a cluster head, the determination being made by the first one of the plurality of nodes in the network, upon determining that the first one of the plurality of nodes is a cluster head, determining, via the first one of the plurality of nodes, if one or more conditions for reclustering are met, having the first one of the plurality of nodes to continue functioning as a cluster head as long as the one or more conditions for reclustering are not met, and upon determining that the one or more conditions for reclustering are met, notifying, via the first one of the plurality of nodes, one or more other nodes of the plurality of nodes that the reclustering operation should be performed at an upcoming determined reclustering time. The one or more conditions for reclustering may be determined as met if a cluster scheduling message has been received from a second one of the plurality of nodes or at least one of the one or more conditions are met for the first one of the plurality of nodes.

A node in a network including a plurality of nodes is disclosed. In one implementation, the node includes a processing unit, and a memory readable by the processing unit. The memory may comprise instructions stored thereon to cause the processing unit to: determine if the node is a cluster head; upon determining that node is a cluster head, determine if one or more conditions for reclustering are met; continue functioning as a cluster head as long as the one or more conditions for reclustering are not met; upon determining that the one or more conditions for reclustering are met, notify one or more other nodes of the plurality of nodes that a reclustering operation should be performed at an upcoming determined reclustering time; and participate in the reclustering operation. The one or more conditions for reclustering may be determined as met if a cluster scheduling message has been received from a second one of the plurality of nodes or at least one of the one or more conditions are met for the first one of the plurality of nodes.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Many approaches exist for clustering networks. Most of these clustering approaches utilize RBP to form clusters. However, the significant number of messages exchanged during the cluster formation phases in RBP and other currently used mechanisms creates a considerable energy overhead. Moreover, as RBP predetermines the reclustering times, it is often associated with a continuous data delivery model, in which nodes are continuously consuming energy.

A solution is proposed here to solve these issues and more by providing an improved method of dynamically scheduling the clustering-task. The dynamic scheduling of the clustering-task may be based on a dynamic hyper round policy (DHRP). The DHRP can decrease the granularity of scheduling the clustering-task by performing the clustering-task at the beginning of each dynamic hyper round instead of in every round. Because a hyper round is a longer time period than that of a round and a hyper round can include many rounds, this can significantly reduce the number of clustering-tasks performed, thus reducing the amount of energy overhead required for reclustering.

In one implementation, to achieve load balancing, DHRP schedules triggering of the clustering-task only at required times and thus eliminates the unnecessary reclusterings done in the currently available approaches. For example, scheduling may be based on various factors such as remaining node energy, node movements, the number of nodes in the clusters, and/or other conditions of the nodes in the network. Therefore, by tuning the reclustering time dynamically, DHRP effectively controls the clustering overhead throughout the network lifetime. Moreover, to enhance performance, the clustering-task can be scheduled by an online algorithm as opposed to an offline algorithm, such as RBP, which does not consider the dynamism of the network conditions. The method of dynamically scheduling the clustering-task may consider the cluster heads' residual energy for scheduling the clustering-task. Thus, this method is adaptable to any data delivery model used for energy-efficient data collection, such as continuous and event-driven.

Centralized approaches are not often scalable, even though scalability is a serious need for many network applications. Therefore, in the current solution, decision making for the scheduling of the clustering operation is often performed via a decentralized approach. In other words, the clustering operation is scheduled in a distributed fashion. This policy can be employed for scheduling the clustering-task in many available data gathering protocols. In other words, DHRP is not only compatible with known clustering protocols such as hybrid energy-efficient distributed (HEED) clustering and low-energy adaptive clustering hierarchy (LEACH), but it can improve their performance.

Figure 1:
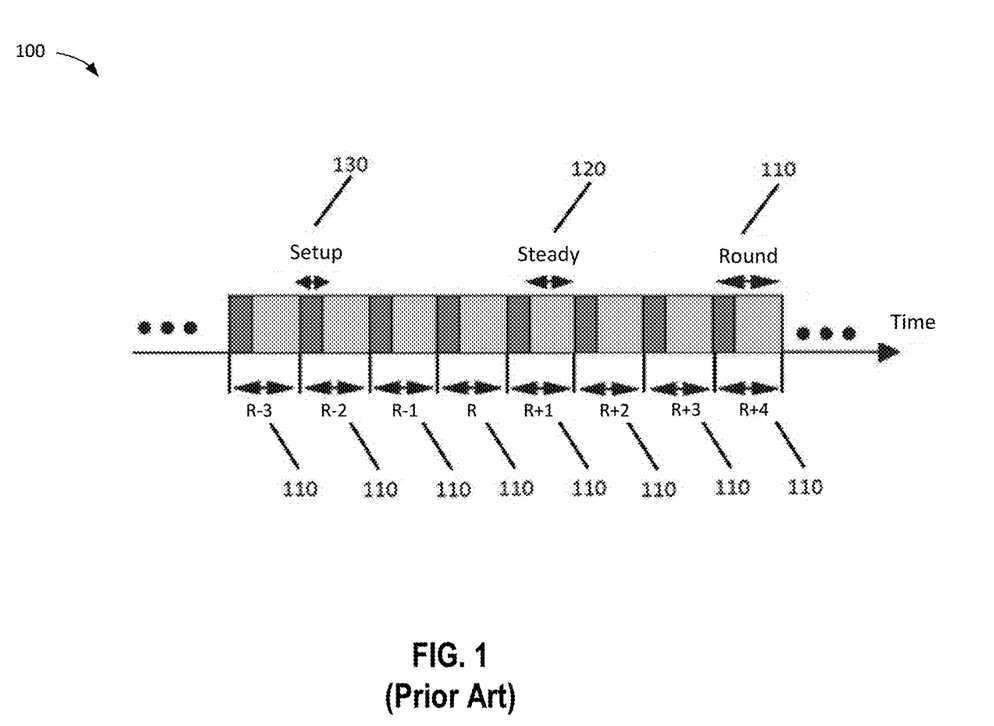
FIG. 1 is a schematic drawing of an example timeline for clustering operations performed in a network according to prior art scheduling methods.

FIG. 1 depicts an example timeline 100 for clustering operations performed according to the RBP policy in a network. The horizontal axis depicts time in the illustrated direction. As shown, the time cycle is divided into a plurality of equal rounds 110. These rounds are labeled as R−3, R−2, R−1, R, R+1, R+2, R+3, and R+4, consecutively. Each round is equal in time to the other rounds and each includes a setup phase 130 and a steady phase 120. During the steady phase, the network performs its normal functions, such as collecting and transmitting data. During each setup phase, on the other hand, the network performs a clustering operation to form clusters in the network and select cluster head nodes for each cluster. This may require, depending on the clustering algorithm used, exchanging numerous messages between the various nodes or between the nodes and a central authority (if any). Because of the significant number of messages that have to be exchanged at each setup phase, a large of amount energy is consumed by the nodes unnecessarily by performing a clustering operation at every round. Moreover, since clustering is performed at fixed intervals in this method, this process is primarily useful when the nodes have consumed significant energy during the steady phase. This, however, does not occur frequently in event-based and query-based data delivery models. Therefore, this fixed timing method may be useful for the continuous data delivery model but may not function well in other delivery models. Moreover, the clustering method performed according to RBP cannot provide a solution for cases in which dynamic balancing of the loads of various nodes in the network (by changing the role of the nodes) may become necessary for a particular situation. This is because clustering by using RBP only takes place at fixed intervals.

To reduce clustering energy overhead, provide load balancing when required, increase network lifetime in networks whose nodes have energy constraints, function correctly with mobile nodes and be usable in clustered networks with specific applications, the solution of utilizing a method of dynamically scheduling the clustering-task is provided herein. This method of dynamically scheduling the clustering-task performs clustering as needed, and as such can replace RBP-based static scheduling by selecting appropriate criteria to determine the clustering time according to the needs of the applications for which the network is being used for.

Figure 2:
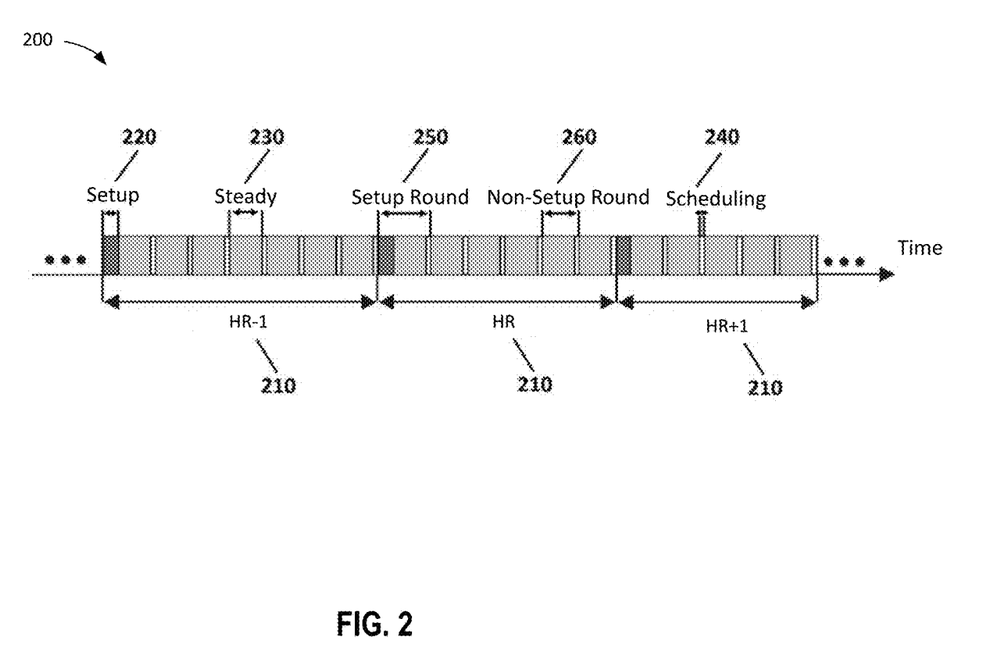
FIG. 2 is a schematic drawing of an example timeline for clustering operations performed in a network according to a method of dynamically scheduling clustering operations.

As an example of methods for dynamically scheduling the clustering operation, dynamic hyper round policy is described herein, however, the current disclosure is not limited to DHRP. FIG. 2 depicts an example timeline for tasks performed according the method of DHRP. The horizontal axis depicts time in the illustrated direction. As shown, the time cycle is divided into a plurality of hyper rounds 210, which are longer than the rounds shown in the timeline of FIG. 1. The rounds in the timeline 200 of FIG. 2 include HR−1, HR, and HR+1. Each hyper round includes a setup round 250 and multiple non-setup rounds 260. The setup round 250 includes a setup phase 220, a steady phase 230, and a scheduling phase 240. A non-setup round 260, on the other hand, only includes a steady phase 230 and a scheduling phase 240. During the steady phase, the network performs its normal functions, such as collecting and transmitting data, while during each setup phase, the network performs a clustering operation to form clusters in the network and select cluster head nodes for each cluster. The network performance during the setup phases 220 and the steady phases 230 may be the same or similar to the ones performed in the setup phases 130 and steady phases 120 of the timeline 100 of FIG. 1, respectively. However, as can be seen from a comparison of the two timelines, timeline 200 includes a much smaller number of setup phases than timeline 100. This is because each hyper round 210 is often much longer than a round 110, as each hyper round 210 continues in operation until the need for a next setup arises. As a result, hyper rounds 210 may not be equal to each other, and may include different numbers of non-setup rounds. For example, hyper round HR−1 includes six non-setup rounds, while hyper round HR includes five non-setup rounds.

With dynamic scheduling based on DHRP, the clustering operation takes place as needed, i.e. at the start of each hyper round. As a result, the length of a hyper round includes the setup round 250 and a multiple of non-setup rounds 260. The number of non-setup rounds varies from hyper round to hyper round. Therefore, the length of the hyper rounds varies and can be determined dynamically and as needed. This means that the current hyper round only ends when certain conditions are met. In one implementation, the length of the current hyper round can be determined at the beginning of the hyper round. This length may be determined through negotiations between the nodes or by predicting future network conditions. In such an implementation, it is not necessary for the nodes or the central authority to check the reclustering conditions.

The scheduling phase 240 may involve determining whether the conditions for starting a next hyper round are satisfied and as such initiating the next hyper round. This determination can be made centrally by one of the nodes and/or by a central authority (which exists on some networks) or it can be done in a distributed manner. In one implementation, if starting a next hyper round is needed, all nodes become informed of the upcoming setup phase 220 during the scheduling phase 240. Notifying the nodes can be done centrally or can be distributed.

As illustrated in FIG. 2, the scheduling phase 240 may be separate from the other phases. Alternatively, the scheduling phase 240 may overlap with one or more of the other phases. For example, the actions necessary for determining whether a new hyper round is necessary may be done during the steady phase 230. Moreover, various stages of the scheduling phase 240 may be done separately. For example, the stage of determining whether the conditions for reclustering are satisfied may be separate from the stage of notifying the nodes. That is each of these stages can be carried out at different intervals.

In one implementation, to determine if reclustering is needed for the network, each cluster head may periodically transmit information about its cluster such as, its remaining energy, any movement of the nodes in the cluster, the number of cluster members, and the like to a central authority. After collecting information about the entire network, the central authority can determine the time a next reclustering is needed and notify the nodes accordingly. However, the use of the central authority as a centralized source for making this determination may turn the decision-making center into a bottleneck system. In addition, gathering the entire network information at the decision-making center requires a lot of exchange of information.

In an alternative implementation, the determination of whether the network needs to be reclustered is made in a distributed manner. For example, cluster head nodes may monitor the condition of their own clusters, and occasionally examine the need for clustering through communications with each other and agree on the clustering time when clustering requirements are met by one or more clusters. Other methods of determining the need for reclustering in a distributed manner are also possible. One of the advantages of the distributed method is that there is no need to communicate with a central authority, and cluster members can decide on the reclustering time based on their local information and negotiating with others.

Figure 3A:
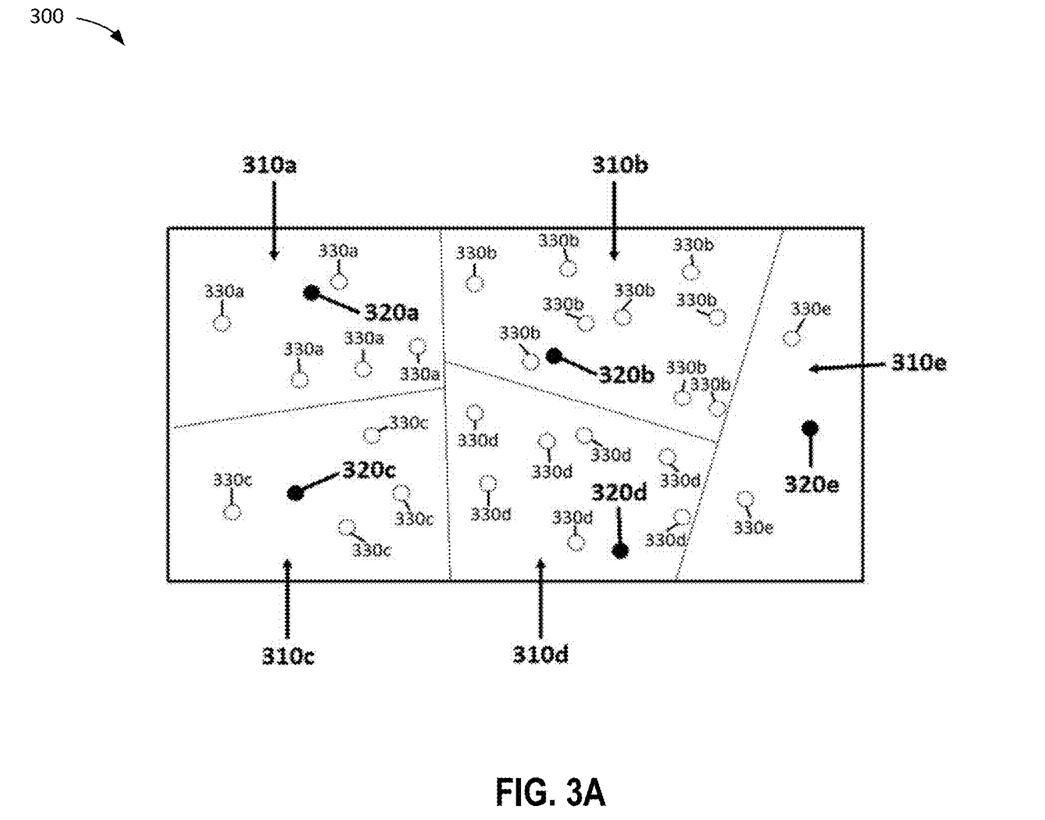
FIGS. 3A-3B are schematic drawings the clustering configurations of an example network in two consecutive hyper rounds.
Figure 3B:
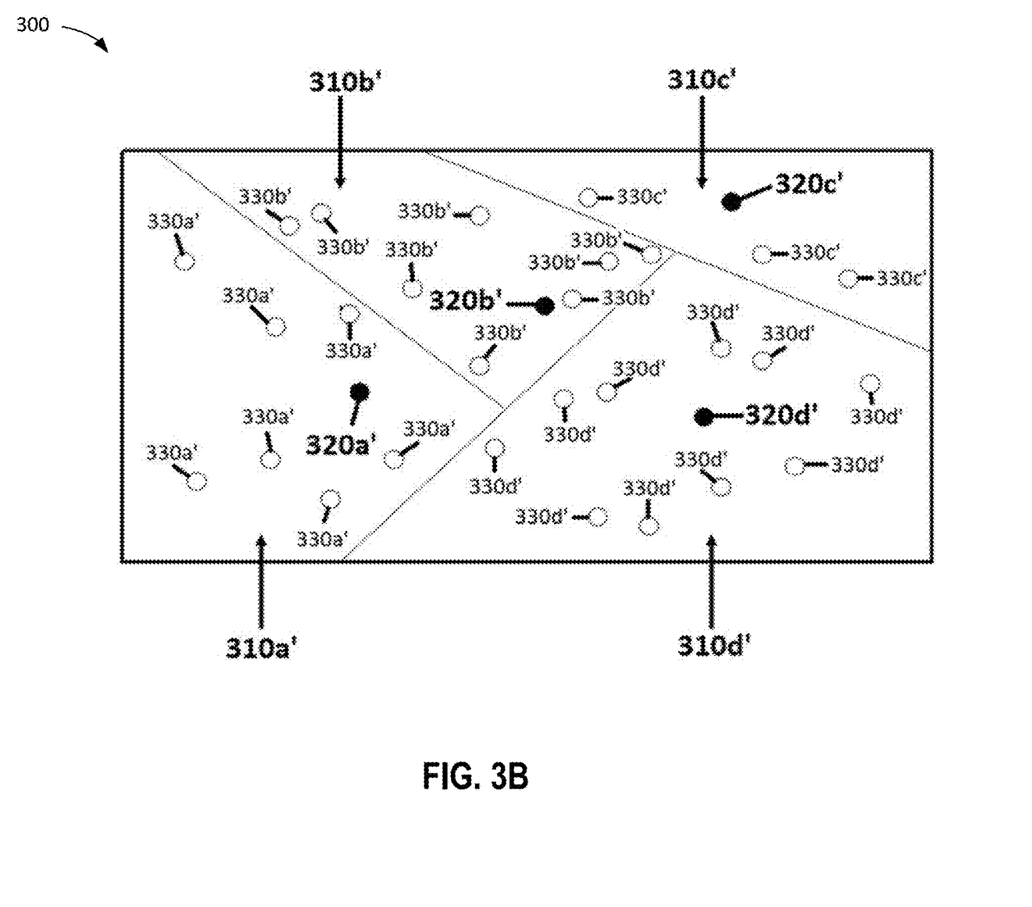

FIGS. 3A-3B depict schematics of the clustering configuration of an exemplary clustered network 300 during two consecutive hyper rounds of the method of dynamically scheduling the clustering operation. FIG. 3A shows the clustering configuration of network 300 during a hyper round HR, while FIG. 3B illustrates the clustering configuration of the same network 300 during a hyper round HR+1. FIG. 3A illustrates that during the hyper round HR, the network 300 is clustered to include five clusters, 310*a*, 310*b*, 310*c*, 310*d* and 310*e*. Each of these clusters includes multiple regular nodes 330 (i.e., 330*a*, 330*b*, 330*c*, 330*d*, and 330*e*, respectively). Each cluster also includes one cluster head 320 (i.e., 320*a*, 320*b*, 320*c*, 320*d*, and 320*e*, respectively). FIG. 3B illustrates that during the hyper round HR+1, the network 300 is clustered to include four clusters, 310*a'*, 310*b'*, 310*c'*, and 310*d'* which are very different from the clusters of FIG. 3A. Each of these clusters include multiple regular nodes 330' (i.e., 330*a'*, 330*b'*, 330*c'*, and 330*d'*, respectively), some of which are different than the regular nodes 330 of the clusters 310 of FIG. 3A. Each cluster in FIG. 3B also includes one cluster head 320' (i.e., 320*a'*, 320*b'*, 320*c'*, and 320*d'*, respectively), which may also be different than the cluster heads of similarly named clusters in FIG. 3A. This shows how the clustering performed at each hyper round may change the network configuration.

Referring back to FIG. 2, the determination of when the setup phase 220 should be performed (the main responsibility of scheduling phase 240) can be made by utilizing different approaches. For example, the scheduling phase 240 for determining when to start the next hyper round may occur during the current setup round 250 by predicting future conditions of the network. An example of this approach implemented in a wireless sensor network is described in the article "Fuzzy-based Clustering-Task Scheduling for Lifetime Enhancement in Wireless Sensor Networks," P. Neamatollahi, M. Naghibzadeh, S. Abrishami, IEEE Sensors Journal, vol. 17, no. 20, 6837-6844, 2017, which is incorporated herein in its entirety. In this approach, the multiple scheduling phases 240 in each hyper round 210 may be eliminated, such that only one scheduling phase 240 occurs during the setup round 250 and the subsequent scheduling phases 240 during the non-setup rounds 260 are all eliminated. Alternatively, the next clustering time may be determined after at least one round of the current hyper round 210 passes. In another alternative approach, determining whether conditions for reclustering are satisfied may be made during all scheduling phases 240 of the current hyper round and if the conditions are met, the current hyper round may end immediately and a new hyper round may begin at the start of which a setup phase 220 is performed. This approach, which may be referred to as an online checking approach, checks the reclustering conditions at the moment and without any prediction of the network's future conditions and based on this information determines when the setup phase 220 should be performed. That is, after determining the conditions are satisfied and informing all nodes in the scheduling phase 240, the setup phase 220 is immediately performed at the start of the next hyper round 210. An example of implementing this method in a wireless sensor network is described in the article "Distributed Clustering-Task Scheduling for Wireless Sensor Networks Using Dynamic Hyper Round Policy," P. Neamatollahi, M. Naghibzadeh, S. Abrishami, M. H. Yaghmaee, IEEE Transactions on Mobile Computing, vol. 17, no. 2, 334-347, 2018, which is incorporated herein in its entirety.

Figure 4:
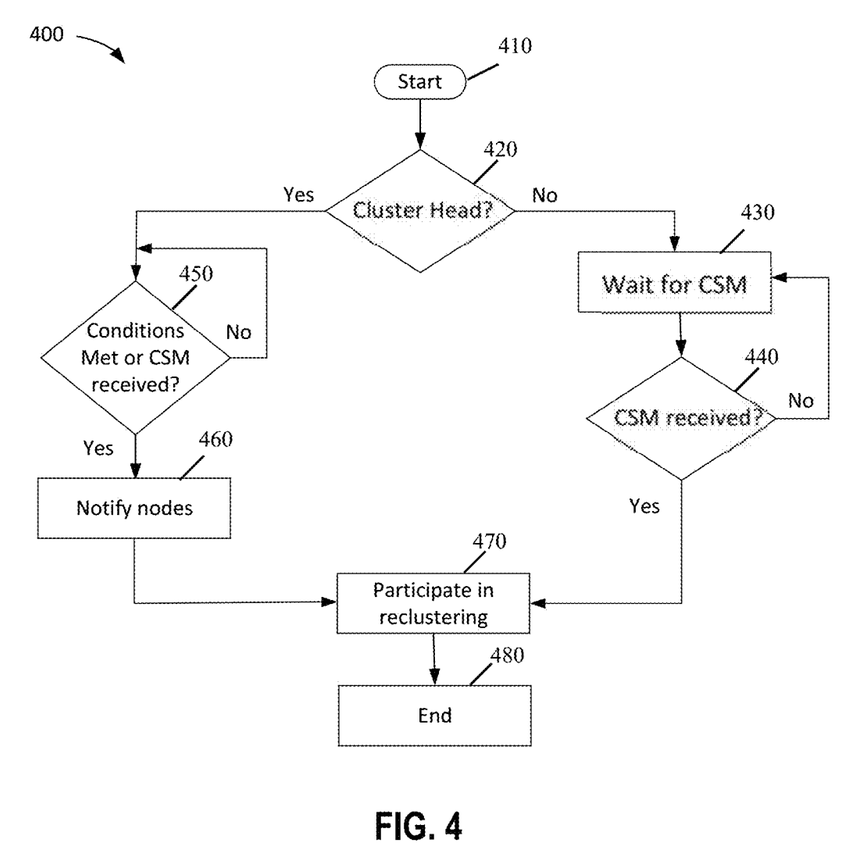
FIG. 4 is a flow diagram for an example method of dynamically scheduling the clustering operations in a network.

FIG. 4 is a flow diagram depicting an exemplary method 400 for scheduling the clustering operation in DHRP. In one implementation, method 400 may be used in the networks in which one or more nodes have energy constraints. In other implementations, method 400 may be used for networks having different application requirements and/or needs, such as node mobility. In the implementation in which method 400 is used in networks having nodes with energy constraints, method 400 may use the remaining energy of cluster heads to determine whether the conditions for reclustering are met. This may be done irrespective of the method used for clustering the network. For such an implementation, each cluster head node stores its remaining energy in a data field, for example a variable called $E_{CH}$, at the end of the setup phase 220 of the current hyper round. At the same time, each cluster head node (e.g., nodes 320a-320e of FIG. 3A) may calculate a remaining energy threshold (indicated by $E_{th}$) for performing reclustering at the required time as follows:

$$E_{th} = RF \times E_{CH} \quad (1)$$

The remaining energy threshold may indicate a threshold energy level for a cluster head at which point reclustering would be required or recommended. This energy level may be calculated such that the role of the node is changed into a regular node before its energy level is depleted below a certain threshold. The threshold may be a point at which the node reaches a low energy level after which it may not properly function as a cluster head.

RF in the above equation (1) is the reclustering coefficient and may be determined according to the application requirements for the network and may fall in the range between zero and one (i.e., $0 \leq RF \leq 1$). After the end of the setup phase of a hyper round (e.g., at the scheduling phase of in each setup round or non-setup round), each cluster head may compare its remaining energy (which may be labeled as $E_{res}$) with its remaining energy threshold. If the cluster head finds that its remaining energy is less than its remaining energy threshold (i.e., $E_{res} < E_{th}$), this indicates a decrease in the energy level of the cluster head which requires reclustering. At this point, the cluster head may inform all network nodes of the need for reclustering.

Performing these steps within the context of method 400, the method may start at 410 by proceeding to determine if the current node is a cluster head node, at 420. In one implementation, when the node is not a cluster head, it does not need to calculate its remaining energy or make other inquires or determinations. As such, when it is determined that the node is not a cluster head, method 400 may proceed to step 430 to wait for a clustering-task scheduling message (CSM). A clustering-task scheduling message may be a message from a cluster head that indicates the need for a reclustering operation. Method 400 then proceeds to determine, at 440, if a CSM has been received. As long as a CSM has not been received, method 400 returns back to step 430 to wait for a CSM. In this case, the node is in a waiting status and as such does not need to send or receive any messages relating to the clustering operations. This may save energy for the node. In one implementation, non-cluster head nodes (i.e., regular nodes) wait for the CSM message at the most up until the time the current scheduling phase finishes. Once it is determined, at 440, that a CSM has been received, the method 400 proceeds to step 470 to have the node participate in the reclustering operation at the time specified in the CSM by the clustering method used by the network.

When it is determined, at 420, that the node is a cluster head node, method 400 proceeds to determine, at 450, if the conditions for reclustering have been met. As discussed above, this may include calculating the nodes remaining energy and comparing that to the remaining energy threshold to determine if the current energy level is acceptable. It should be noted that, in one implementation, the reclustering conditions may be determined based on the application's criteria. As long as reclustering conditions have not been satisfied and no CSM has been received from other cluster heads (i.e., determination indicates No at step 450), the method 400 returns back to step 450 to wait till the conditions are met or a CSM is received. If the scheduling phase terminates while determination indicates No at step 450, the clustered network follows its tasks without any change in its configuration during the next non-setup round. Once it is determined, that the conditions have been met, the method 400 proceeds to notify the other nodes in the network that reclustering needs to be scheduled, at 460. As previously discussed, notifying the other nodes of the need for reclustering can be carried out in a centralized or distributed manner. For example, the cluster head can send a CSM to the central authority (if any) or to one of the nodes (either directly or through other nodes). The central authority and/or the receiver node may then broadcast this message to the entire network. In one implementation, the cluster head sends the CSM to its adjacent cluster heads in the same way. Upon receipt of the message, each cluster head may inform the members of the cluster to participate in the setup phase at the time specified in the CSM and may forward the CSM to the neighbor cluster heads, if required. This may be done at step 470 of the method 400, before the method proceeds to end at 480.

Therefore, with this exemplary method 400 reclustering is performed under certain conditions rather than in fixed-time intervals. With this method, when the cluster head nodes have a large amount of remaining energy, the hyper round will be long, because the cluster heads can manage their clusters for a long period of time. However, in networks such as wireless sensor networks where nodes have energy constraints, to increase network lifetime, as the remaining energy of cluster head nodes gradually decreases, the need for load balancing increases. As a result, in these circumstances, the length of the hyper rounds decreases. Therefore, in order to obtain load balancing as needed, this exemplary method 400 schedules clustering operations only when needed. That is, it eliminates unnecessary RBP reclusterings. As a result, the exemplary method 400 effectively controls cluster energy overhead by adjusting clustering time dynamically and as needed. Therefore, the energy overhead created by the sequential RBP reclusterings decreases significantly.

In general, some of the results that can be achieved with the methods described in herein include: reducing the clustering energy overhead, performing load balancing as needed, increasing the network lifetime in networks whose nodes have energy constraints, adapting to node movements, and usability in clustered networks with specific applications.

Computer simulation results of an example method of dynamically scheduling the clustering operation (i.e. DHRP) as discussed herein will be described with reference to FIGS. 5A-5D. In the simulation, a HEED clustering protocol utilizing the dynamic scheduling method of reclustering operations proposed herein was compared with the classical HEED which runs its clustering based on RBP.

Computer simulation environment for the example clustering method of FIGS. 5A-5D was set as follows:
Dimensions of the network environment: 100 meters long by 100 meters wide
Random distribution of each node
Data packet size: 100 bytes and control packet size: 25 bytes
Initial energy of each node: a random value in the interval of 2-4 Jules
Except for the chart of FIG. 5A, the other charts (FIGS. 5B-5D) have an average number of 50 simulation runs.

Figure 5A:
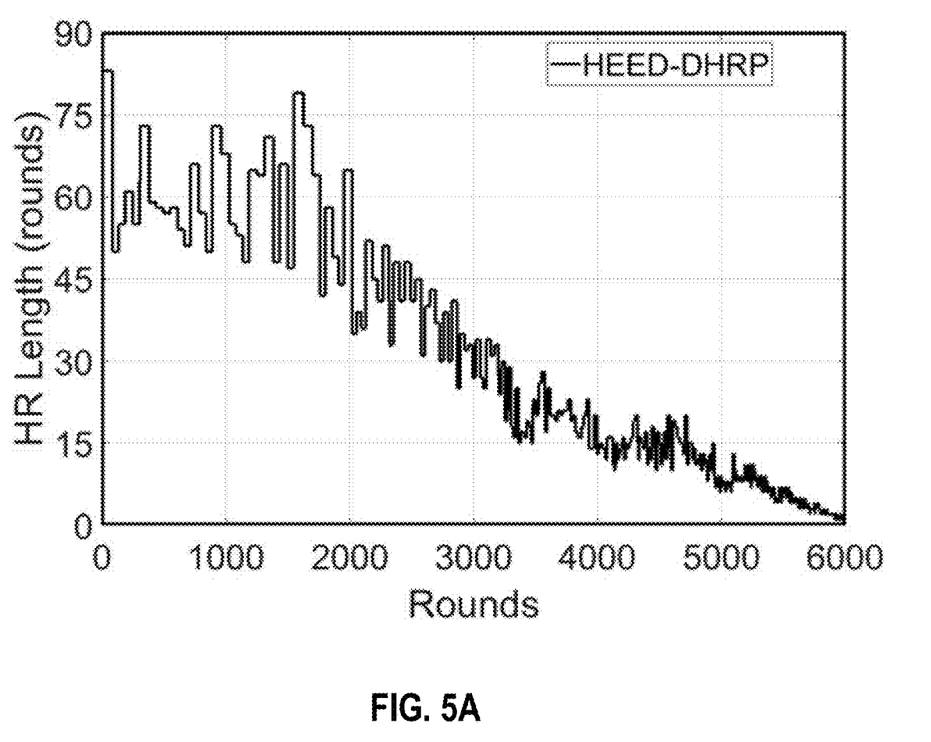
FIG. 5A is a chart showing dynamic changes in the length of hyper rounds using an example method of dynamically scheduling the clustering operations (based on dynamic hyper round policy) for a given example network.

Given the above simulation environment, FIG. 5A depicts the dynamic changes in the length of hyper rounds for a given example network having 200 nodes. Since at the beginning of the simulation, the cluster heads have a lot of energy, the length of the hyper rounds is long. For example, the length of the first hyper round is in between 75 and 90 (83). This means that, the cluster heads selected in the first hyper round can continue functioning in their management role for 83 rounds without the need to recluster, whereas prior art methods of scheduling the clustering-task (e.g., RBP) would force the network to recluster approximately 83 times during this period. As the time passes, the energy of the remaining nodes decreases, and as such the need for balancing the load of the network nodes increases. As a result, the length of the hyper rounds decreases as time goes on until towards the end of the simulation time, before the energy of all nodes drains, the length of the hyper rounds becomes almost equal to the length of a round in RBP.

Figure 5B:
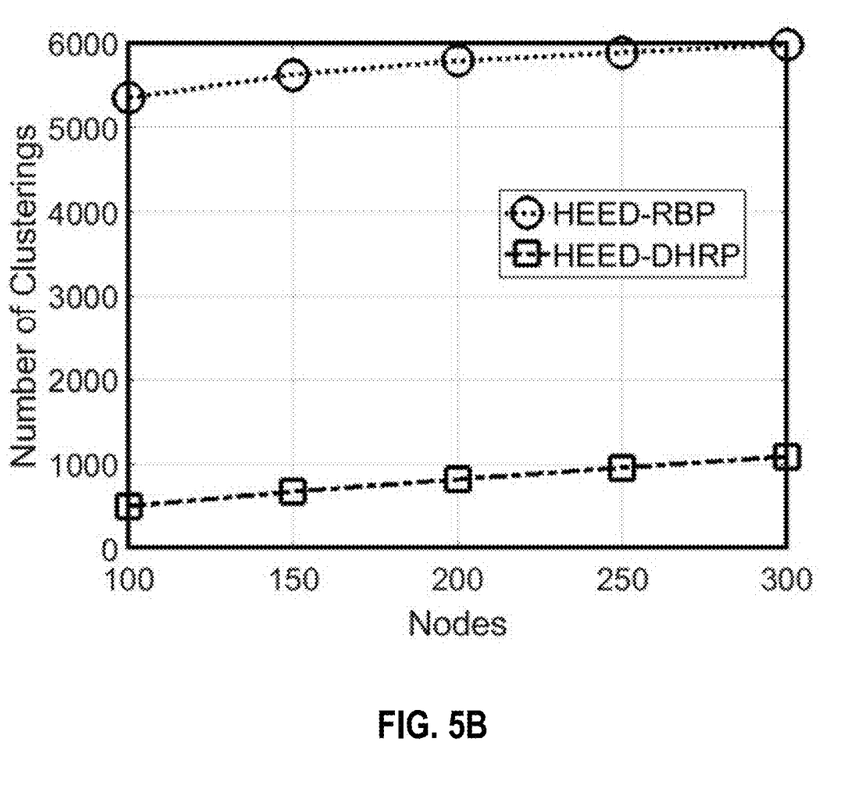
FIG. 5B is a chart showing the number of reclusterings performed during the network lifetime over different number of nodes of an example network by both a clustering protocol utilizing the method of dynamically scheduling the clustering operation (based on dynamic hyper round policy) and a clustering protocol using a prior art process.

FIG. 5B depicts the number of reclusterings in different number of nodes performed during the lifetime of the example network by both the HEED protocol utilizing DHRP (the exemplary method of dynamically scheduling the clustering operation disclosed herein) and the HEED protocol using the RBP. As shown, the number of reclusterings performed while using the dynamic method of scheduling the reclustering operations approximately 81% less than the number of reclusterings performed while using the HEED protocol with RBP. This shows a significant decrease in the number of reclusterings performed and thus the potential for energy savings using the method disclosed herein.

Figure 5C:
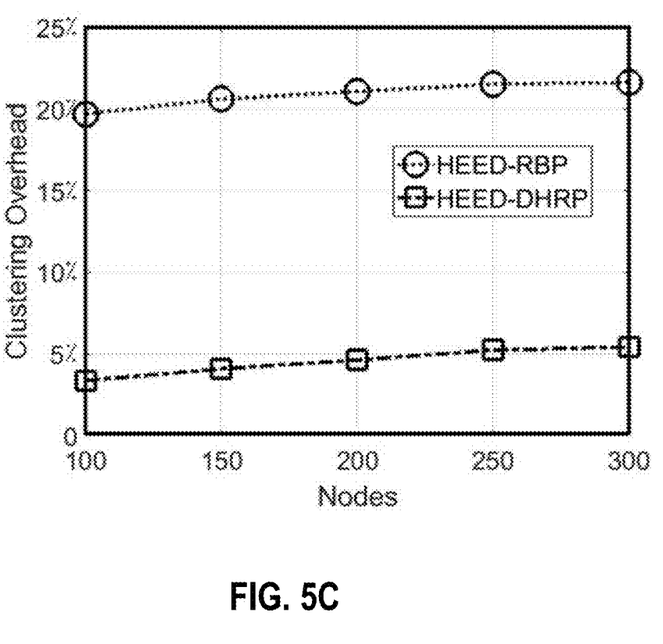
FIG. 5C is a chart showing the clustering energy overhead over different number of nodes for both a clustering protocol utilizing an example method of dynamically scheduling the clustering operation (based on dynamic hyper round policy) and a clustering protocol using a prior art process.

FIG. 5C depicts the clustering energy overhead for clustering operations per the number of nodes for both the HEED protocol utilizing DHRP and the HEED protocol using the RBP process. Since HEED-DHRP performs clustering based on DHRP and has fewer reclustering operations, it has approximately 74% less clustering energy overhead than the clustering energy overhead imposed on nodes by the HEED-RBP protocol. Therefore, one of the main shortcomings of the clustering approach in wireless sensor networks which is reclustering energy overhead is addressed by the application of the disclosed DHRP method.

Figure 5D:
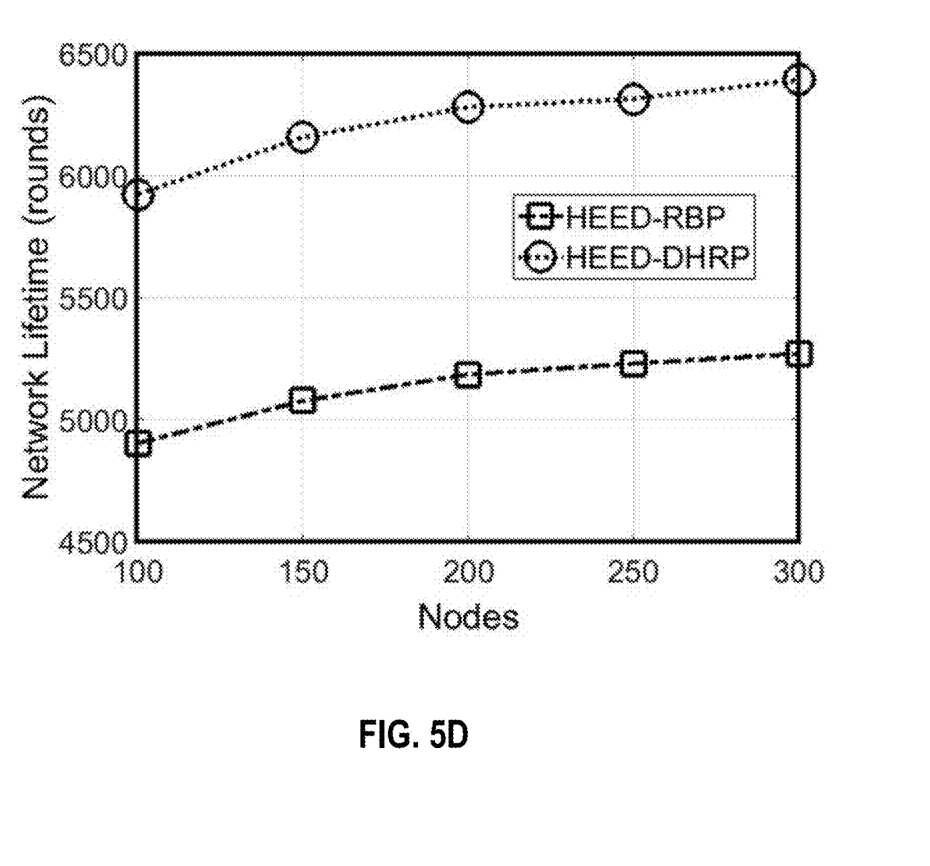
FIG. 5D is a chart of total network lifetime over number of nodes for both a clustering protocol utilizing an example method of dynamically scheduling the clustering operation (based on dynamic hyper round policy) and a clustering protocol using a prior art process.

FIG. 5D depicts the total network lifetime per number of nodes for both the HEED-RBP and HEED-DHRP. This illustrates that for the example network, as compared to HEED-RBP, the disclosed HEED-DHRP increases the network lifetime by at least 20%. In addition, comparing network lifetime for a number of nodes indicates that, with increasing number of nodes, network lifetime in HEED-DHRP is not reduced. As a result, the method of DHRP is easily scalable to larger networks.

Figure 6:
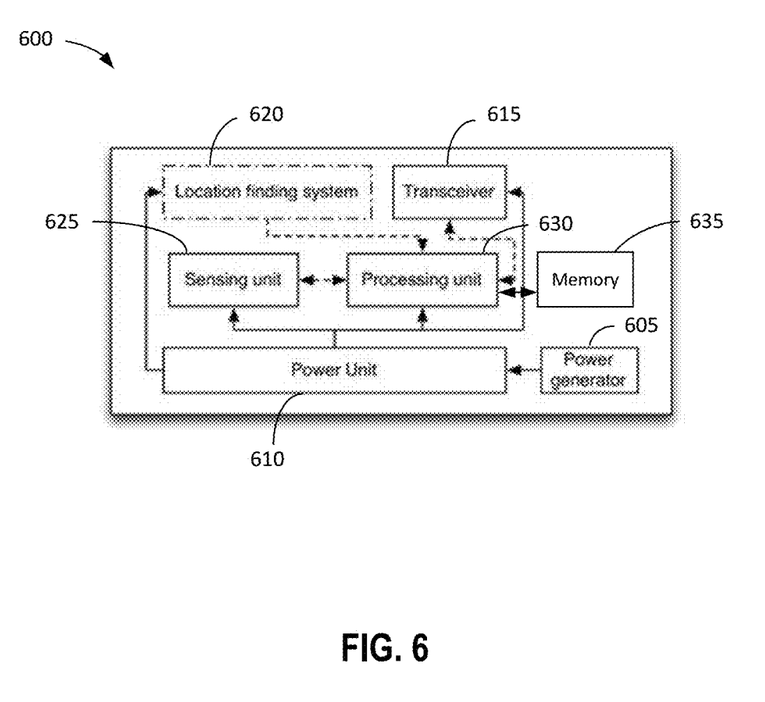
FIG. 6 is a block diagram of an exemplary node upon which aspects of this disclosure may be implemented.

FIG. 6 is a block diagram showing an example node 600 upon which aspects of this disclosure may be implemented. Node 600 illustrates an example node in a network such as network 300 of FIGS. 3A-3B. In one implementation, the node 600 includes a transceiver 615 or other communication mechanism for communicating information, and a processor 630 coupled with the transceiver 615 for processing information. Transceiver 615 may include a communication interface for two-way data communication coupling to a network link connected to the network.

Node 600 also includes a memory 635, such as a random-access memory (RAM) or other dynamic storage device, coupled to processor 630 for storing information and instructions to be executed by the processor 630. Main memory 635 also may be used for storing temporary variables or other intermediate information during execution of instructions to be executed by processor 630. The node 600 can implement, for example, one or more steps of the method 400 for scheduling the clustering operation in the presented methods of the current disclosure.

Memory 635 can also include a read only memory (ROM) or other static storage device for storing static information and instructions for processor 630. For example, memory 635 can include a storage device, such as a flash or other non-volatile memory for storing information and instructions.

In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Node 600 also includes a power generator 605 such as a solar power generator or a charger for providing power to the power unit 610 that supplies the energy to the remaining elements of the node 600. This may be done by, for example, charging the power unit 610, which may include a battery. Node 600 may also include a location finding system such as a global positioning system (GPS) for identifying the location of the node at any given time. Additionally, the node 600 may include a sensing unit 625 for sensing (i.e., collecting data about) one or more parameters of the environment. For example, the sensing unit 625 may include temperature sensor, accelerometers, motion sensors and the like for collecting information about the sensing environment. This information may then be processed via the processing unit and transmitted via the transceiver 615. In other implementations, the node may not include a sensing unit. It should be noted that FIG. 6 is simplified block diagram of an exemplary node. A node may also include many other units and elements for performing various other functions.

It should be noted that in the above description, sometimes reference was made to particular types of network. However, such references should not be considered as a limitation of the invention to a specific type of network. The methods described above can be utilized in any energy-efficient clustered network (such as a sensor network) or with mobile nodes (such as IoT devices), or any other clustered network where nodes need to be distributed, or for any reason, nodes must be reclustered frequently.

It should be noted that although in some of the examples given, network nodes are homogeneous, they do not need to be. The methods disclosed herein can also be used for heterogeneous networks. In addition, the present invention techniques are not affected by the uneven distribution of node energies used in some applications. Moreover, the nodes described above do not need to be stationary or mobile and can be both. As mentioned above, the method of dynamically scheduling the clustering operation disclosed herein has a wide range of applications, such as in health care, environmental monitoring and smart city.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A method for scheduling a reclustering operation in a network including a plurality of nodes, the method comprising:
   determining if a first one of the plurality of nodes is a cluster head, the determination being made by the first one of the plurality of nodes in the network;
   upon determining that the first one of the plurality of nodes is a cluster head, determining, via the first one of the plurality of nodes, if one or more conditions for reclustering are met;
   having the first one of the plurality of nodes to continue functioning as a cluster head as long as the one or more conditions for reclustering are not met; and
   upon determining that the one or more conditions for reclustering are met, notifying, via the first one of the plurality of nodes, one or more other nodes of the plurality of nodes that the reclustering operation should be performed at an upcoming determined reclustering time;
   wherein:
   the one or more conditions for reclustering are determined as met if a cluster scheduling message has been received from a second one of the plurality of nodes or a condition for the first one of the plurality of nodes is met,
   the reclustering operation is performed in a setup round of a hyper round in the network,
   each hyper round includes one setup round and one or more non-setup rounds, and
   one or more hyper rounds in the network have different lengths of time.

2. The method of claim 1, wherein the setup round includes a setup phase, a steady phase, and a scheduling phase.

3. The method of claim 2, wherein the plurality of nodes perform the reclustering operation in the setup phase and the network performs normal operations during the steady phase.

4. The method of claim 2, wherein the scheduling phase comprises determining when a reclustering operation should be performed.

5. The method of claim 2, wherein the scheduling phase overlap one or more other phases.

6. The method of claim 1, wherein each one of the one or more non-setup rounds includes a scheduling phase and a steady phase.

7. The method of claim 6, wherein the scheduling phase may be is removed from the one or more non-setup rounds by determining the upcoming determined reclustering time at the setup round of a current hyper round.

8. The method of claim 1, further comprising upon determining that the first one of the plurality of nodes is not a cluster head, waiting for the cluster scheduling message from the second one of the plurality of nodes, and participating in the reclustering operation at a time specified in the cluster scheduling message.

9. The method of claim 1, wherein notifying the one or more other nodes of the plurality of nodes comprises at least one of sending a clustering scheduling message from the first node to a central authority or sending the clustering scheduling message from the first node to the one or more nodes of the plurality of nodes in the network.

10. The method of claim 1, wherein a condition for the first one of the plurality of nodes include an energy level of the first node.

11. The method of claim 1, further comprising determining if an energy level of the first node is below a threshold energy level, wherein upon determining that the energy level is below the threshold level, the one or more conditions are determined as met.

12. The method of claim 1, wherein the condition for the first one of the plurality of nodes includes at least one of the first one of the plurality of node's distance from a particular node or a central authority, a level of the first one of the plurality of node's mobility, a number of nodes in one or more clusters, and a number of clusters in the network and the one or more conditions depend on an application of the network.

13. The method of claim 1, wherein the determination of whether the one or more conditions are met is made by at least one of a central authority or one or more nodes of the plurality of nodes in the network.

14. The method of claim 1, wherein notifying the one or more other nodes of the plurality of nodes is done after calculating the upcoming determined reclustering time.

15. The method of claim 1, wherein the one or more conditions for reclustering include any one of a distance from a particular node or a central authority to any one of the plurality of nodes or a level of mobility of any one of the plurality of nodes.

16. A node in a network including a plurality of nodes, the node comprising:
  a processor; and
  a memory readable by the processor and comprising instructions stored thereon to cause the processor to:
    determine if the node is a cluster head;
    upon determining that node is a cluster head, determine if one or more conditions for reclustering are met;
    continue functioning as a cluster head as long as the one or more conditions for reclustering are not met;
    upon determining that the one or more conditions for reclustering are met, notify one or more other nodes of the plurality of nodes that a reclustering operation should be performed at an upcoming determined reclustering time; and
  participate in the reclustering operation,
  wherein:
    the one or more conditions for reclustering are determined as met if a cluster scheduling message has been received from another one of the plurality of nodes or a conditions for the nodes is met,
    the reclustering operation is performed in a set up round of a hyper round in the network,
    each hyper round includes one setup round and one or more non-setup rounds, and
    one or more hyper rounds in the network have different lengths of time.

17. The node of claim 16, wherein the setup round includes a setup phase, a steady phase, and a scheduling phase.

18. The node of claim 16, wherein the memory comprises instructions stored thereon to cause the processor to further determine if an energy level of the node is below a threshold energy level, wherein upon determining that the energy level is below the threshold level, the one or more conditions are determined as met.

* * * * *